June 27, 1944.   F. KRAISSL, JR   2,352,269
STRAINER AND FILTER
Filed Jan. 21, 1942
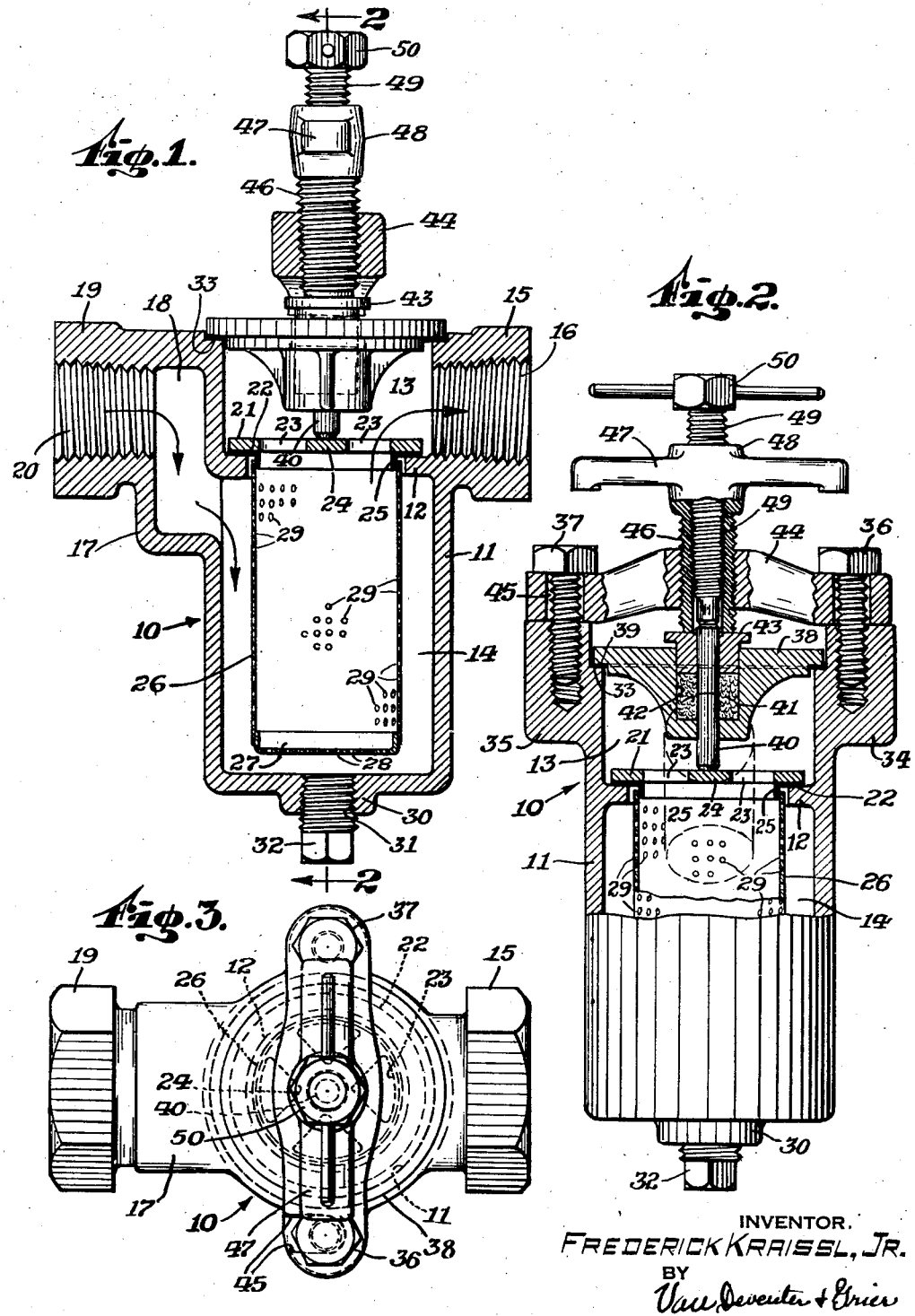
INVENTOR.
FREDERICK KRAISSL, JR.
BY
Van Deventer & Grier
ATTORNEYS.

Patented June 27, 1944

2,352,269

UNITED STATES PATENT OFFICE 2,352,269

STRAINER AND FILTER

Frederick Kraissl, Jr., North Hackensack, N. J.

Application January 21, 1942, Serial No. 427,553

9 Claims. (Cl. 210—165)

This invention relates to improvements in strainers and filters, and is directed more specifically to strainers and filters of the "basket" type for removing undesirable impurities and foreign matter from fluids or gases.

The principal object of the invention is the provision in a strainer or filter employing separating mediums in the form of baskets, means external to the body of the filter for securing the sealing flange of a filter basket and in sealed relation to its seat so that the same cannot become displaced whether the flow of the fluid medium being treated passes therethrough from the inside of the basket to the outside thereof, or the reverse.

A further object of the invention is the provision of means in a strainer or filter body for giving quick access to the interior of said body and permitting the filter basket to be easily removed therefrom and/or replaced.

Yet another object of the invention is the provision in a strainer or filter of means external to the body of the strainer or filter for controlling the pressure exerted to maintain the filter basket on its seat even though the filter body should be hermetically sealed from the atmosphere.

Yet another object of the invention is the provision of a strainer or filter body having a removable closure member for hermetically sealing the interior of the same from the atmosphere, and the provision, in said closure member, of a movable member maintained in sealed relation to said closure member and having its inner end engageable with apparatus in the interior of said body, and having an exterior portion accessible whereby said interior apparatus may be controlled externally of said body.

Another object of the invention is the provision in a casing for strainers or filters, of a closure member having a shaft extending therethrough from the exterior of said body to the interior thereof, the provision of a stuffing box engaging said shaft, and the provision of means external to said body for exerting pressure on the gland of said stuffing box, thereby maintaining a seal on said shaft and at the same time exerting a sealing pressure between said closure member and said body.

Other objects and advantages of the invention will be apparent to those skilled in the art upon reading the specification.

Referring to the drawing, which is given by way of example to illustrate the principle of the invention:

Figure 1 is a sectional elevation showing a fluid medium passing through the strainer in a counter-flow direction;

Figure 2 is an elevation, partly in section, taken along the line 2—2 of Figure 1; and Figure 3 is a plan view of the device shown in Figure 1.

The filter body, generally designated by the numeral 10, consists of a generally cylindrical body 11 having an annular flange 12 formed therein and dividing the interior of said body into an upper chamber 13 and a lower chamber 14. A boss 15, preferably formed integral with the body 11, has a threaded hole 16 formed therein and communicating with the upper chamber 13.

An extension 17 is formed on the body 11 and has formed therein a hollow passage 18. Preferably formed integral with the extension 17 and the body 11 is a boss 19 having a threaded hole 20 formed therein and in communication with the passage 18, which is in turn in communication with the lower chamber 14.

Instead of the bosses 15 and 19, which in the embodiment shown are hexagonal in form, it will be understood that flanges, or any other coupling means, may be substituted, as these bosses, with their threaded holes, merely form means for connecting the body to conduits conveying the fluid medium to be treated and for taking the fluid medium away after treatment thereof.

An annular seat is formed on the upper surface of the annular flange 12, and a disc 21 with a suitable sealing medium 22 associated therewith is adapted to effect a seal with the seat on the flange 12.

The disc 21 may have holes 23 formed therein leaving a central bridge 24 therein, the purpose of which will be presently described.

A flange 25 associated with the disc 21 may have secured thereto a cylindrical screen 26, and the lower end of this screen may have an internal or external cap 27 secured thereto carrying perforations 28, not larger than the perforations 29 in the cylindrical screen 26.

It will, of course, be understood that the screens may be of any desired mesh in accordance with the work to be done, it being customary to use a screen whose mesh is finer than the size of the particles of foreign matter to be eliminated. For the separation of particles down to and including one-sixty-fourth ($\frac{1}{64}$) of an inch across, however, separating elements or baskets are manufactured from perforated metal and the complete device is designated as a strainer basket.

For finer separation, the baskets are made from either metal or fabric cloth, porous material, glass, or other permeable or semi-permeable membrane which has the capability to effect the desired degree of filtration, and the complete device in this specification is designated as a filter basket.

The body 11 may also have a boss 30 formed on the bottom thereof which may have a tapped hole 31 formed therein to accommodate a plug 32 or any other fitting desirable for the purpose of draining off and cleaning out the device.

A hole is formed in the top of the body 11 so as to give access to the interior of said body. About this hole is formed an annular seat 33. Oppositely disposed on said body and projecting above the seat 33 are bosses 34 and 35 having tapped holes formed therein to accommodate the bolts 36 and 37 respectively.

A closure member 38 carries an annular sealing face which is adapted to, with the sealing member 39 therebetween, effect a seal with the annular seat 33 on said body in a manner to be presently described.

The closure member 38 is preferably circular in form and concentric with its axis is a shaft 40 which extends through a suitable hole formed in the boss portion 41 of the member 38. The shaft 40 projects through this boss and is adapted to engage the bridge 24, as will presently be described.

Within a suitable hole 41 formed in the member 38 is formed a stuffing box 42 having a gland 43, so that pressure may be exerted on said gland, and said shaft is thereby sealed against the leakage of the medium from the interior of the body.

A member 44 spans the top of the body 11 and has a hole formed at one end through which the bolt 37 passes. The other end of the member 44 has a slot 45 formed therein of a suitable width to accommodate the shank of the bolt 36 so that under certain conditions the bolts 36 and 37 may be slackened and the member 44 may be swung around radially about the bolt 37 as an axis, thereby making the closure member 38 accessible.

A central threaded hole is formed in the member 44 to accommodate a hollow threaded shaft 46. The upper end of the shaft 46 carries a handle 47 so that the threaded shaft 46 may thereby be caused to exert pressure on the stuffing box gland 43, and this pressure is also imparted to the closure member 38 and thereby maintains the seal between the closure member 38 and the annular seat 33.

The hub 48 and the shank of the handle 47 have a central hole formed therein. Threads formed in this hole match the threads 48 formed on the shaft 49. The shaft 49 is a stepped shaft, the larger diameter of which has the threads 48 formed thereon, and the smaller diameter thereof clears the interior of the hollow shaft 46.

A handle 50 is secured to the upper end of the shaft 49, above the threads 48, and when this handle is rotated in the proper direction, pressure is exerted by the lower end of the shaft 49 upon the upper end of the shaft 40, thereby causing the shaft 40 to move longitudinally and to engage and exert pressure upon the bridge 24 of the disc 21 and thereby effect a seal between the seat on the annular flange 12 and the sealing face of the disc 21 forming a part of the strainer basket or filter basket 26.

Normally the flow in strainers or filters of the basket type is exactly opposite to the direction indicated by the arrows in Figure 1, and I wish to point out that my filter will operate when the flow of the fluid medium is opposite to the direction of the arrows because the direction of flow in that instance tends to maintain the seal between the basket and the flange 12. However, in many instances superior results are obtained by having the fluid medium move in the direction indicated by the arrows. However in ordinary strainers of the prior art, the movement of the fluid medium in the direction indicated by the arrows actually unseats the filter basket and results in the strainer not straining or the filter not filtering.

However, in my new and improved device herein described, it is impossible for the fluid medium to break the seal between the basket and its seat (the sealing face on the ledge 12) regardless of what direction it passes through the basket.

By means of the handle 47, the seal between the interior of the filter and the atmosphere may be adjusted, the seal being effected both on the stuffing box and on the sealing face 33. By means of the handle 50, any desired pressure may be exerted upon the basket within the filter body without the necessity of having to open it up.

Although I have herein described one embodiment of the invention by way of example, it is obvious that many changes may be made in the specific arrangement shown by those skilled in the art without departing from the spirit of the invention as defined in the annexed claims.

What is claimed is

1. In a strainer or filter, a hollow body having an inlet and an outlet, an opening formed in said body and having a sealing seat thereabout a strainer supporting ledge in said body between said outlet and said inlet, a strainer positioned on said ledge within said body and removable through said opening, a closure for said opening having a sealing face adapted to cooperate with said seat, means extending upwardly from said body, a bridge member detachably engaging said means, a shaft extending through said closure, a stuffing box on said closure for sealing said shaft thereto, a tubular member threadedly engaging said bridge member and adapted to exert pressure on said stuffing box and at the same time to maintain said closure in sealed relation to said body, and a threaded shaft mounted in said tubular member outside said body adapted to engage said first shaft and maintain said strainer in intimate contact with said ledge inside said body.

2. In a strainer, a hollow body having a shelf formed therein dividing the interior into two chambers, an inlet communicating with one of said chambers, an outlet communicating with the other of said chambers, a strainer seat formed on said shelf and an opening therethrough communicating with both said chambers, a hole formed in said body in line with said seat, a strainer basket having an upper flange adapted to be passed through said hole and to be positioned on said seat with the basket portion extending through said opening, a cover member for said hole and means to hold the same in sealed relation with said body, a shaft extending through said cover member and having its inner end in force transmitting relation with said flange, a stuffing box extending outwardly from said cover for effecting a fluid-tight seal between said shaft and said cover member, whereby said shaft may be moved longitudinally therein, and means for exerting force on the outer end of said shaft, whereby said force will be transmitted to said flange for maintaining the latter in sealed relation with said strainer seat.

3. In a strainer, a hollow body having a shelf formed therein dividing the interior into two chambers, an inlet communicating with one of said chambers, an outlet communicating with the other of said chambers, a strainer seat formed on said shelf, a hole formed in said shelf concentric with said seat and communicating with both said chambers, a second hole formed in said body in line with said seat, a strainer basket having a flange thereon and adapted to be passed through said second hole and to be positioned on said seat with the basket portion thereof extending through said first hole, a cover member for said second hole and means to hold the same in sealed relation with said body, a shaft extending through said cover member and having its inner end in force transmitting relation with the flange of said basket, a stuffing box formed in and having a gland extending outwardly from said cover member for engaging said shaft and maintaining a seal between said shaft and said cover member, said stuffing box permitting said shaft to be moved longitudinally therein, and means for exerting force on the outer end of said shaft whereby said force will be transmitted to said flange for maintaining it on said seat.

4. The invention according to claim 3, in which the means to hold said cover member in sealed relation with the body also exerts pressure on said gland.

5. In a strainer, a hollow vertical body having a shelf formed therein near the upper end thereof dividing the interior into two chambers, an inlet communicating with one of said chambers, an outlet communicating with the other of said chambers, a strainer seat formed on said shelf, a strainer basket having an upper flange adapted to cooperate with said strainer seat, an opening formed in said body through which said basket and its flange may pass, a sealing face formed for said opening and having a sealing surface adapted to be forced into sealing engagement with said sealing face, means on said body for maintaining said sealing engagement, a shaft extending through said cover member and having its inner end adapted to engage said basket and to maintain a seal between said flange and said strainer seat, a stuffing box in said cover member sealingly engaging and permitting said shaft to be moved longitudinally without leakage of material from said body to the atmosphere, said stuffing box having a gland extending upwardly on said closure member, and means carried on said body for exerting pressure on the outward end of said shaft and thereby maintaining said last mentioned seal.

6. A strainer according to claim 5 in which said stuffing box gland forms a medium through which said means on said body for maintaining said sealing engagement exerts pressure both for maintaining said sealing engagement and for maintaining said seal.

7. In a strainer, a hollow body having an opening formed in the top thereof and a shelf formed therein between the top and the bottom thereof dividing the interior of said body into two chambers, an inlet connection on said body communicating with one of said chambers, an outlet connection on said body communicating with the other of said chambers, a strainer seat formed on said shelf, a hole formed in said shelf concentric with said seat communicating with both said chambers, a strainer basket carrying a flange adapted to cooperate with said strainer seat, said basket and its flange being adapted to pass through said opening and said basket being adapted to extend through said hole in said shelf, a sealing face formed on the top of said body about said opening, a closure member for said opening having a sealing surface adapted to cooperate with said face, a stuffing box formed in said closure member and including a gland accessible from outside said strainer, a shaft extending through and sealingly engaged by said stuffing box and having its inner end adapted to engage said basket, means on said body for exerting pressure on said gland and conjointly maintaining said stuffing box in sealed relation with said shaft and the sealing surface of said closure member in fluid tight relation with said sealing face, and other means on said body for exerting pressure on said shaft, thereby forcing the latter into engagement with said basket and maintaining a seal between said flange and said strainer seat.

8. In a filter, a hollow body having a shelf formed therein dividing the interior thereof into two chambers, a hole formed in said shelf communicating with both said chambers, an inlet communicating with one of said chambers, an outlet communicating with the other of said chambers, a seat formed on said shelf concentric with said hole, a flange having a filter basket depending therefrom, said flange being adapted to be maintained in sealed relation with said seat, a shaft extending from the exterior to the interior of said body and adapted to exert pressure on said flange, a stuffing box embracing and sealingly engaging said shaft for preventing a fluid medium from escaping about said shaft to the atmosphere, said stuffing box having a gland, means external to said body and engaging the outer end of said shaft for moving the latter endwise and thereby forcing and maintaining said flange into sealed relation with said seat, an opening in said body, a closure member adapted to seal said opening and forming a support for said stuffing box, and means on said body for exerting pressure on said gland, said pressure being in turn imparted to said closure member for sealing said opening.

9. In a strainer, a hollow body having a shelf formed therein dividing the interior into two chambers, a hole formed in said shelf communicating with both said chambers, an inlet communicating with one of said chambers, an outlet communicating with the other of said chambers, a strainer seat formed on said shelf and bordering said hole, an opening formed in said body in line with said seat, a strainer basket having a flange thereon and adapted to be passed through said opening and positioned on said seat with said basket extending through said hole, a sealing face formed on said body about said opening, a cover for said opening and including a sealing face on one side thereof adapted to cooperate with the sealing face on said body, a stuffing box formed in said cover and including a gland on the other side thereof, a shaft extending through said cover member horizontally engaged by said stuffing box and having its inner end in force transmitting relation with said basket, a bridge member secured to said body, a hollow threaded shaft in said bridge member in axial alignment with said gland, means on the upper end of said hollow shaft for turning the same, a clamping shaft in axial alignment with said hollow shaft and having threads formed thereon engaging at least a portion of the interior of said hollow shaft for exerting pressure on said first mentioned shaft, and means on said clamping shaft for rotating the same and exerting force on said strainer basket via said first shaft for maintaining a seal between said flange and said strainer seat, said hollow shaft being adapted to exert pressure on said stuffing box gland and thereby maintain said sealing engagement with said first mentioned shaft and at the same time to maintain a seal between the sealing face on said cover and the sealing face on said body.

FREDERICK KRAISSL, Jr.